April 28, 1953     B. W. G. JACKSON ET AL     2,636,970
APPARATUS FOR SOFTENING WAXES OR THE LIKE MATERIALS
Filed Sept. 5, 1951

INVENTOR:
B. W. G. Jackson
BY & Clarence Skinner
Watson, Cole, Grindle & Watson
ATTORNEY:

April 28, 1953   B. W. G. JACKSON ET AL   2,636,970
APPARATUS FOR SOFTENING WAXES OR THE LIKE MATERIALS
Filed Sept. 5, 1951   2 SHEETS—SHEET 2

INVENTOR:
B.W.G. Jackson
& Clarence Skinner
BY:
Watson, Cole, Grindle & Watson
ATTORNEY:

Patented Apr. 28, 1953

2,636,970

UNITED STATES PATENT OFFICE 2,636,970

APPARATUS FOR SOFTENING WAXES OR THE LIKE MATERIALS

Bernard William George Jackson, Southampton, and Clarence Skinner, Grays, England Application September 5, 1951, Serial No. 245,216
In Great Britain April 11, 1951

7 Claims. (Cl. 219—19)

This invention concerns apparatus for softening waxes or the like materials and relates more particularly to apparatus for softening or melting the wax portions of bite blocks.

In making dentures it is customary to form a plaster mould and to produce a replica of the mould in which a mass of wax takes the place of the teeth. The depth of the mass is greater than the depth of the teeth and the bite block is introduced to the mouth to ascertain the amount of wax which is to be removed so that the upper and lower dentures properly meet.

Hitherto the process of removing the wax has been done by hand using a warm spatula to soften and work the wax. This procedure requires that a heating means be provided for the spatula (such as a gas ring or Bunsen burner) and it is found not only that the procedure is protracted but that with continual use of the means for heating the spatula the room in which the operations are proceeding becomes excessively warm and the wax of the bite block tends to soften. The working conditions also are unpleasant.

An object of the present invention is to provide apparatus for shaping bite blocks whereby the above disadvantages are reduced or overcome and according to the present invention the apparatus comprises in combination, a member having a substantially flat surface, electric means for heating said member, and means to collect wax or the like melted on said surface, said surface being adapted to have applied to it the body or wax or the like which is to be shaped and being positioned such that the molten wax drains therefrom, and into the collecting means.

When the bite blocks have been shaped such that their plane faces properly meet, it is sometimes the practice to join them together. Hitherto this has been done by working on the abutting surfaces of the blocks in known manner with a warm spatula. This method of joining the bite blocks is objectionable for reasons similar to those discussed above, and it is accordingly another object of the present invention to provide means whereby the plane surfaces of the shaped bite blocks may be rapidly treated and softened such that when the two bite-blocks are introduced into the mouth, and the mouth is closed the blocks are united together.

According to a feature of the present invention therefore, there is provided in addition to said flat surface a surface comprising a plurality of generally parallel ribs which is adapted to have applied to it the body of wax or the like which is to be treated, and which is positioned such that the molten wax drains therefrom between the ribs.

It is preferred that the flat surface is inclined to the horizontal, and said collecting means is a removable receptacle positioned beneath the lower edge of said surface. It is also preferred that said ribbed surface is inclined to the horizontal and positioned above said flat surface such that molten wax drains therefrom, on to said flat surface.

Preferably, the ribs are of an inverted V-section, and the last rib on each side of the ribbed surface is flat topped, and the channel formed between the flat-topped rib and the next adjacent rib is deeper than the channels between adjacent V-section ribs.

Preferably also, the member is formed with channels which bound said flat surface at its inclined edges, and said channels communicate one with the channel between the last pair of adjacent ribs on the ribbed surface at each side of the ribbed surface.

In practice the temperature of the heated surfaces is maintained at a predetermined level by means of a thermally operated switch so as to ensure that the surface of the wax which is applied to them is melted or softened without deleteriously affecting the main body of the wax, and two indicating lamps are provided, one to show when the heating current is switched on, and the other to show when the surfaces are at the predetermined level of temperature.

A specific embodiment of the present invention will now be described, merely by way of example with reference to the accompanying drawings whereof:

Figure 2:
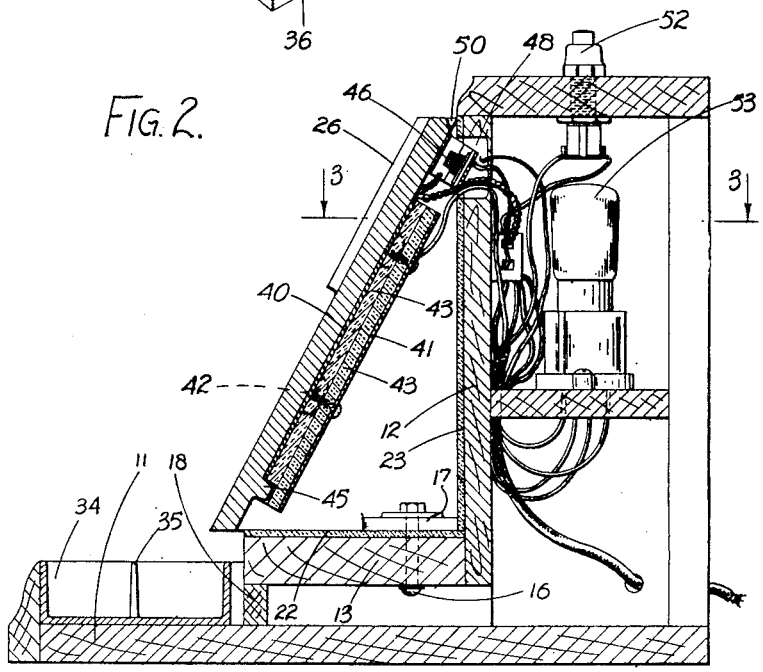
Figure 2 is a cross-sectional view of the apparatus shown in Figure 1 showing certain of its constructional features.

Referring to the drawings, the apparatus comprises a cabinet generally indicated at 10 which is fixed to a tray 11. The cabinet and tray are fabricated from wood, although any other suitable material may be used if desired. The front wall of the cabinet 12 is made to be removable, and carries at its lower edge a stand 13 which rests in the tray 11 as at 18 when the front wall is in position (see particularly Figure 2). The stand carries a wedge shaped housing generally indicated at 15 which is an aluminium, or aluminium alloy casting having two generally triangular side walls 14 and an inclined member 20. The housing may however be fabricated from sheet metal of high thermal conductivity such as copper or the like if desired. The housing is of a width less than the width of the stand, and is secured to the stand by means of bolts 16 which pass through lugs 17 cast integrally with the side walls 14 of the housing such that the open back of the housing rests against the wall 12 of the cabinet and the lower edge 32 of the member 20 overhangs the front 19 of the stand 13 as best shown in Figure 2. The housing is insulated from the stand 13 and the wall 12 by means of asbestos sheets 22 and 23 respectively.

Figure 1:
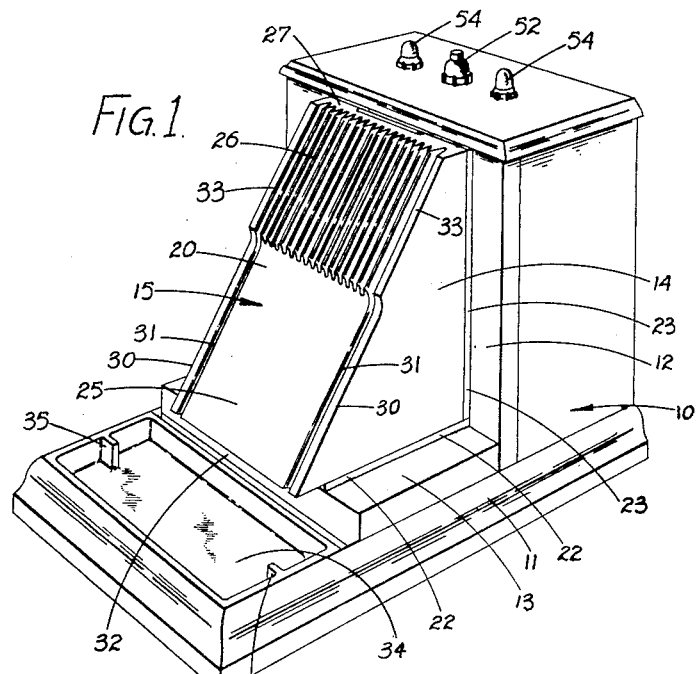
Figure 1 is a perspective view of an apparatus in accordance with the invention.

The inclined member 20 of the housing is divided into an upper and a lower portion of which the surface 25 of the lower portion is substantially flat, whilst the upper portion has a plurality of generally parallel upstanding ribs 26 of an inverted V-section which extend downwardly from the upper edge 27 of the inclined member 20 as shown in Figure 1.

A short distance from each inclined edge 30 of the member 20 there is a channel 31 which extends from the upper edge 27 of the member 20 to its lower edge 32, and the ribs 26 lie between the channels 31 which are parallel and are, throughout their length, of uniform depth in member 20. Lying outside each channel and beside the ribbed portion of the member 20 is a relatively wide flat-topped rib 33.

A receptacle 34 fits into the tray 11 in front of the stand 13 and beneath the lower edge 32 of the member 20, to receive the molten wax which runs down the surface 25 of the member 20 between the channels 31 and also down these channels, the latter being provided to direct any molten wax which flows to the sides of the surface 25 downwardly into the receptacle 34. In the apparatus now being described, the receptacle is a casting having slightly tapered internal walls to facilitate the removal of the wax after setting and is formed with two inwardly directed lugs 35 by which the receptacle may be lifted from the tray 11.

Figure 3:
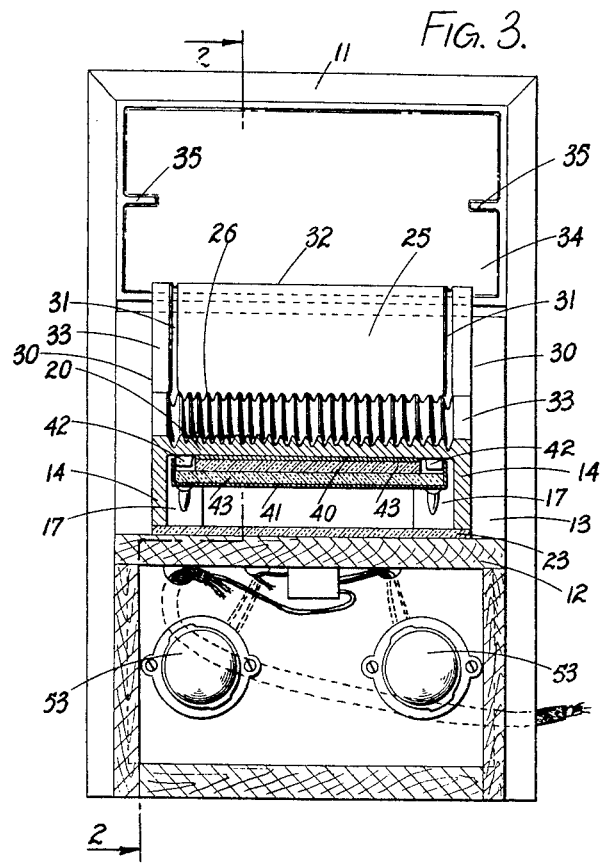
Figure 3 is a cross-sectional view of the apparatus along the line 3—3 of Figure 2.

Referring now to Figures 2 and 3, an electric heating element 40 is clamped (within the housing 15) to the back of the member 20 by means of a plate 41 which is screwed to lugs 42 cast integrally with the member 20 of the housing. The element is insulated from the plate in usual manner by asbestos sheets 43, and lies behind the surface 25 and the ribs 26, between the lugs 42, and against a bottom stop 45 (see Figure 2).

In the apparatus which is now being described a thermostat 46 is carried within the housing 15 by the member 20 above the resistance element 40, and the front wall 12 of the cabinet 10 is recessed, as at 48, to receive the thermostat. Above the thermostat the upper edge 27 of the member 20 is recessed to form an air vent 50. The thermostat is wired in circuit with the heating element, and is set to maintain the temperature of the ribbed and flat surfaces of the member 20 at the desired level.

A switch 52 for the element is provided mounted on top of the cabinet 10, and the cabinet also carries two indicator lamps 53 (see Figure 3) which illuminate two transparent domes 54 respectively. The domes are conveniently coloured one red, and one amber.

Figure 4:
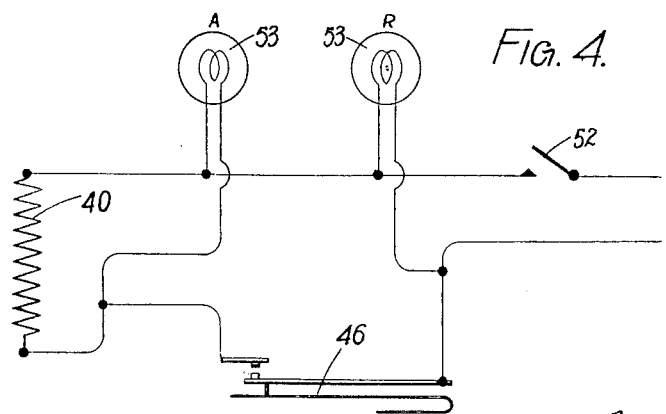
Figure 4 is a circuit diagram for the apparatus.

Referring to Figure 4, the lamp which illuminates the red dome is wired across the power leads to indicate when the switch 52 is closed. The lamp which illuminates the amber dome is wired in parallel with the heating element, such that when the desired temperature of the surfaces (as determined by the thermostat), is reached, both the element and the amber dome are switched off.

In use, the dental surgeon or other operator applies the bite block to the surface 25 of the member 20, the heating element having previously been switched on and the required temperature reached, and as a result the wax of the block is slowly melted to impart a desired shape to the block. The molten wax runs down the surface 25 and the channels 31 into the receptacle 34 where it resets and from which it may be recovered for subsequent use. The dental surgeon manipulates the bite block so as to remove the wax where required and the flat surface ensures that a plane face is formed on the bite block when this has been suitably reduced in size.

When the bite blocks are to the required shape they may be joined together by pressing the plane surface of each block against the ribs of the upper portion of the face member in order to form a series of parallel grooves (or two sets of grooves at right angles to each other) in the plane face of the bite blocks and at the same time to soften the wax near the plane face, whereupon the two bite blocks are introduced into the mouth and brought together in usual manner, the softened wax uniting the two blocks.

The procedure referred to above applies when a set of upper and lower dentures are being made. The procedure followed when making an upper or lower set of dentures only is generally the same.

With the apparatus described, since the heat is directly and locally applied by the heating element to the member 20, it is found that use of the apparatus over extended periods does not result in the room becoming so hot that the wax of the bite blocks becomes soft, also the working conditions are more congenial.

Another advantage associated with the apparatus is that the temperature of the inclined member is automatically and accurately controlled by the thermostat so as to ensure that the surface of the wax which is applied to the inclined member is melted or softened without deleteriously affecting the main body of the wax. In this way the softening and moulding may be made largely independent of the skill and judgment of the dental surgeon.

The procedure in shaping the bite blocks followed by certain dental surgeons does not require the use of the ribbed upper portion of the inclined member and accordingly the apparatus may be generally as described above, the upper portion of the inclined member being dispensed with. In another arrangement the ribbed and flat portions may be formed on a common inclined member and arranged side by side instead of one above the other as described above.

We claim:

1. For shaping wax bite blocks, apparatus comprising in combination, a shaping member, an electric element for heating said member to a temperature above the melting point of the wax, a frame to support said element and said shaping member so that a surface of the latter is exposed for engagement by the bite block thereby selectively to melt the wax and shape the bite block and a receptacle to receive molten wax, the exposed shaping surface of the member being so arranged that the molten wax drains off said surface into the receptacle.

2. For shaping wax bite blocks, apparatus comprising in combination, a plate-like member having a plane surface, an electric element for heating said member to a temperature above the melting point of the wax, a frame to support said element and said member so that said plane surface is exposed for engagement by the bite block thereby selectively to melt the wax and shape the bite block, and a receptacle to receive molten wax, said plane surface being so arranged that the molten wax drains off said surface into the receptacle.

3. For shaping wax bite blocks, apparatus comprising in combination a plate-like member having a surface composed of a plurality of generally parallel ribs, an electric element for heating said member to a temperature above the melting point of the wax, a frame to support said element and said member so that said surface is exposed for engagement by the bite block thereby selectively to melt the wax and shape the bite block, and a receptacle to receive molten wax, said ribbed surface being so arranged that the molten wax drains off said surface between the ribs and into the receptacle.

4. For shaping wax bite blocks, apparatus comprising in combination a plate-like member having a plane surface, an electric element for heating said member to a temperature above the melting point of the wax, a frame to support said element and said member so that said plane surface is exposed for engagement by the bite block thereby selectively to melt the wax and shape the bite block and is inclined to the horizontal, and a receptacle supported by said frame to receive molten wax drained from said surface.

5. For shaping wax bite blocks, apparatus comprising in combination a plate-like member having a surface composed of a plurality of generally parallel ribs, an electric heating element for heating said member to a temperature above the melting point of the wax, a frame to support said element and said member so that said ribbed surface is exposed for engagement by the bite block thereby selectively to melt the wax and shape the bite block and is inclined to the horizontal so that wax melted on said surface drains off the surface between the ribs, and a receptacle supported by said frame to receive molten wax drained from said surface.

6. Apparatus as claimed in claim 3, wherein the ribs are of an inverted V-section.

7. Apparatus as claimed in claim 4, wherein said member has a pair of channels each to bound one inclined edge of said plane surface.

BERNARD WILLIAM GEORGE JACKSON.
CLARENCE SKINNER.

References Cited in the file of this patent
UNITED STATES PATENTS

| Number | Name | Date |
| --- | --- | --- |
| 1,396,957 | Heidbrink | Nov. 15, 1921 |
| 1,831,832 | Wise | Nov. 17, 1931 |
| 1,913,704 | Elkan | June 13, 1933 |
| 1,962,007 | Dow | June 5, 1934 |
| 2,041,542 | Gribble | May 19, 1936 |
| 2,187,760 | Sherman | Jan. 23, 1940 |
| 2,248,867 | Hallman, Sr. | July 8, 1941 |
| 2,500,219 | Troupe | Mar. 14, 1950 |
| 2,576,371 | Thompson et al. | Nov. 27, 1951 |